United States Patent [19]

Velling

[11] 4,406,747

[45] Sep. 27, 1983

[54] APPARATUS FOR THE COOLING OF SOLID RESIDUES OF GASIFICATION

[75] Inventor: Günter Velling, Bornheim-Hersel, Fed. Rep. of Germany

[73] Assignee: Rheinische Braunkohlenwerke AG, Cologne, Fed. Rep. of Germany

[21] Appl. No.: 274,701

[22] Filed: Jun. 17, 1981

Related U.S. Application Data

[62] Division of Ser. No. 104,249, Dec. 17, 1979, Pat. No. 4,288,294.

[30] Foreign Application Priority Data

Dec. 23, 1978 [DE] Fed. Rep. of Germany ....... 2856059

[51] Int. Cl.$^3$ ..................... C10B 39/02; C10B 39/04
[52] U.S. Cl. ..................... 202/227; 48/77; 202/228; 202/253; 202/270
[58] Field of Search ........... 202/95, 227, 228, 253, 202/270; 201/1, 36, 38, 39; 48/77, 197 R, 210; 208/8 R; 266/122, 195; 432/77, 83, 85; 110/171; 60/39, 465; 55/82

[56] References Cited

U.S. PATENT DOCUMENTS

| | | | |
|---|---|---|---|
| 2,357,303 | 9/1944 | Kerr et al. | 60/39.46 S |
| 2,399,884 | 5/1946 | Noack | 60/39.46 S |
| 2,683,657 | 7/1954 | Garbo | 48/203 |
| 3,252,871 | 5/1966 | Destremps | 201/36 |
| 3,848,344 | 11/1974 | Kemmetmueller | 202/228 |
| 4,066,513 | 1/1978 | Jablin | 201/39 |
| 4,211,607 | 7/1980 | Privalov et al. | 202/228 |
| 4,264,415 | 4/1981 | Galow et al. | 202/228 |

FOREIGN PATENT DOCUMENTS

2650512  5/1978  Fed. Rep. of Germany ......... 55/82

Primary Examiner—Bradley Garris
Attorney, Agent, or Firm—Panitch, Schwarze, Jacobs & Nadel

[57] ABSTRACT

The present specification describes and claims a method and apparatus for use in cooling the solid residue of gasification of a reactor operated at a pressure above atmospheric for the gasification of carbonaceous materials. The residue of gasification is conducted out of the reactor into a cooling apparatus located therebelow and flows through the cooling apparatus from the top to the bottom thereof. A cooling liquid is introduced into the solid residue in the upper region of the cooling apparatus and is metered such that the greater portion of the heat contained in the residue is eliminated in the form of heat of vaporization, sensible heat and chemical binding energy with the resultant steam and reaction products produced. The remaining residual heat which corresponds to the difference between the desired final temperature and the temperature after cooling by the liquid, is eliminated by a gas blown into the bottom region of the cooling apparatus and/or by indirect heat exchange.

5 Claims, 2 Drawing Figures

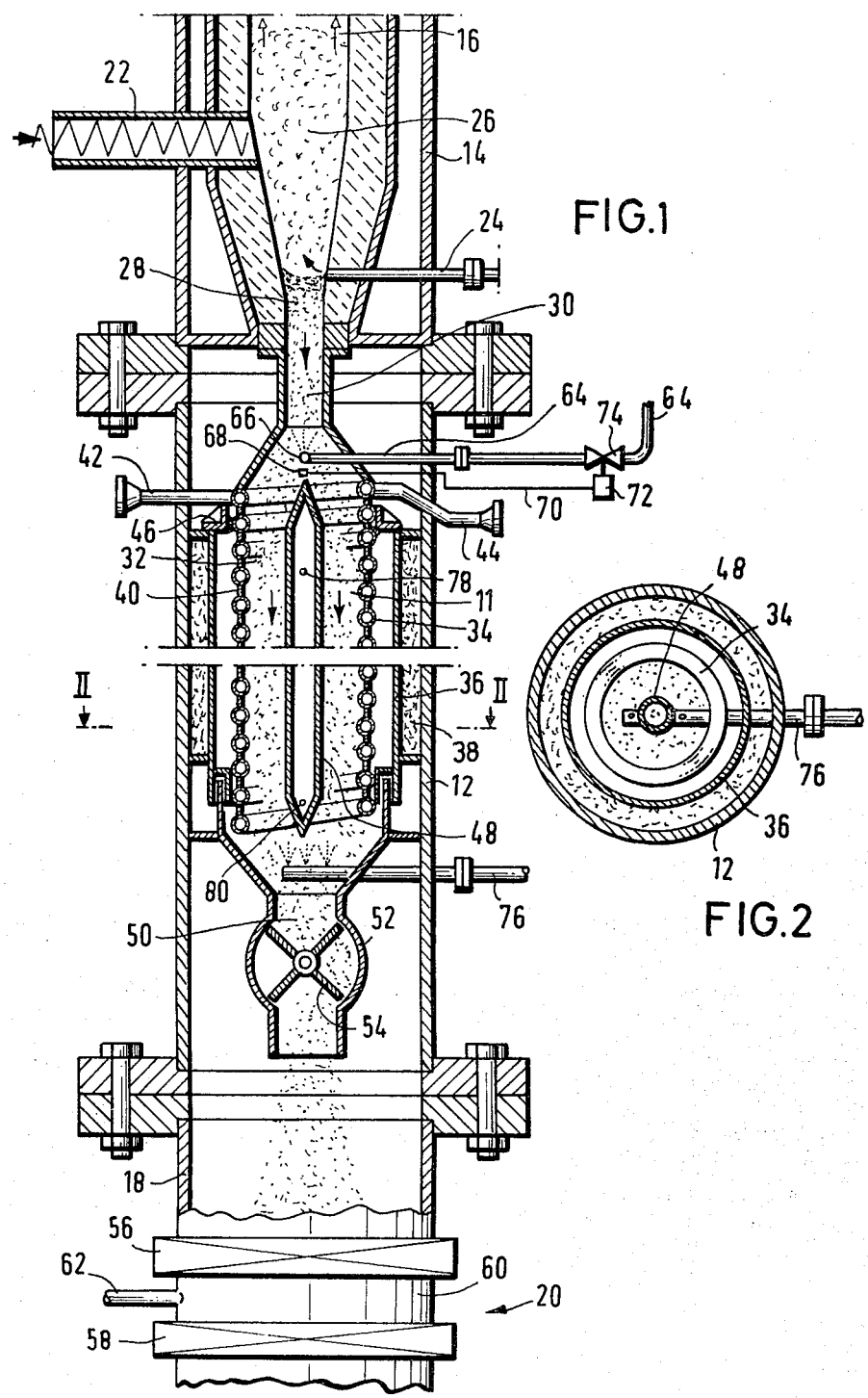

APPARATUS FOR THE COOLING OF SOLID RESIDUES OF GASIFICATION

CROSS REFERENCE TO RELATED APPLICATION

This application is a divisional application of copending application Ser. No. 104,249, filed Dec. 17, 1979, now U.S. Pat. No. 4,288,294, issued Sept. 8, 1981.

The present invention relates to a method and an apparatus for cooling the solid residues of gasification of a reactor operated under over-pressure for the gasification of carbonaceous materials, wherein the residues of gasification are conducted out of the reactor into a cooling apparatus located therebelow and flow through the cooling apparatus substantially from the top to the bottom thereof.

Cooling apparatus of this kind form a unit with the reactor with respect to the operating pressure i.e. the operating pressure of the reactor prevails in the cooling apparatus.

In general, it is necessary to cool the solid residues of gasification, which are hereinafter referred to as "residual coke" and which can be entirely of predominantly ash, before they are conducted out of the pressure region, since the handling of the residual coke involves many difficulties and the plants and transportation means coming into contact with the hot residual coke would also be subjected to considerable stresses. Normally, a temperature in the order of magnitude of 250° to 200° C. upon leaving the cooling apparatus will be sufficiently low. Thus, a considerable cooling capacity is required if the initial temperature of the residual coke lies at for example, 900° to 1000° C. upon leaving the reactor and entering the cooling apparatus.

It is desirable for the cooling apparatus to have a large throughput capacity and a large cooling capacity and to keep it physically as small as possible, particularly to ensure that the overall height of the entire apparatus forming part of the pressure region is not substantially greater than it has to be, taking into account, for example, the requirements relating to the reactor.

The most obvious possibility is that of cooling the residual coke exclusively by quenching by means of water, although this always involves considerable difficulties if special precautions are not taken. Thus, in the event of too great a quantity of water, residual moisture can remain in the coke and can possibly be present in such a quantity that the residual coke and the water together form a cake or even sludge. It has to be taken into account that the granular size of the residual coke will generally be fine to very fine, for example in the order of magnitude of 0 to 5 mm. In the case of wet residual coke, there is the risk that it will cake on the walls of the cooling apparatus, so that the cross section of the passage through the cooling apparatus is reduced and might even be reduced to zero, with the result that the cooling apparatus will be clogged. Since the cooling apparatus and the reactor form an operating unit, it has to be taken into account that any fault or trouble in the cooling apparatus necessarily leads to a fault or an interruption in the operation of the reactor. The use of too large a quantity of cooling liquid necessarily leads to a corresponding large quantity of steam which, since it flows into the reactor, can impair the gasification process in the reactor, at least in certain cases. This applies in the case of, for example, hydro-gasification in which the other gases contained in the hydrogen should, in general, be as few as possible. It will be appreciated that the hydrogen used as a gasification agent cannot be 100% hydrogen in practical operation, since the residual moisture in the coal to be gasified always itself leads to the formation of steam and thus to the production of CO and $CO_2$. However, in general, it will be desirable to minimise the steam content in such cases.

An aim of the present invention is, inter alia, to develop a method and an apparatus of the kind described initially, such that the solid residues of the gasification process taking place in the reactor can be rapidly and inexpensively cooled to a temperature at which the residual coke can be readily handled and which does not over stress the devices for receiving and transporting the residual coke. The gasification process should not be impaired either directly or indirectly to any great extent by the steps of the method necessary for the cooling operations. It is to be ensured in all cases that the cooled residual coke can be removed from the pressure region in a state in which it does not contain any moisture, or only such small quantities of moisture that its ability to flow within the cooling apparatus is not impaired. The residual coke should under all circumstances flow through the cooling apparatus in a trouble-free manner at the desired rate.

According to the present invention there is provided a method of cooling the solid residues of gasification of a reactor operated under over-pressure for the gasification of carbonaceous materials, wherein the residues of gasification are conducted out of the reactor into a cooling apparatus located therebelow and flow through the cooling apparatus from the top to the bottom thereof, cooling liquid being introduced into the solid residues of gasification in the upper region of the cooling apparatus and being metered such that the greater portion of the heat contained in the residues is eliminated in the form of heat of vaporization and sensible heat and chemical binding energy with the resultant steam and the reaction products produced, and the remaining residual quantity of heat, which corresponds to the difference between the desired final temperature and the temperature after cooling by the liquid, is eliminated by gas which is blown into the bottom region of the cooling apparatus and/or by indirect heat exchange.

It is advantageous to regulate the quantity of cooling gas to be fed in dependence upon the temperature monitored by a temperature sensor provided at a suitable location. Advantageously, the quantity of cooling liquid which is admitted is regulated in dependence upon the temperature of the residue of gasification by means of a temperature sensor which is located in the direction of flow of the said residues at such a distance downstream of the location at which the liquid is admitted that adequate cooling is effected on the one hand and, on the other hand, a troublesome residual water content of the coke is avoided. It has proved to be advantageous to eliminate in this manner 75% of the total heat to be dissipated.

The method in accordance with the invention can be performed by using an apparatus which is disposed below the reactor and which forms therewith a system subjected to a pressure above atmospheric, a feed line for a cooling liquid being provided in the top region of a substantially chute-like interior space of the cooling apparatus, a temperature sensor being disposed downstream of this location in the direction of flow of the gasification residues to be cooled, and the bottom region of the cooling apparatus being provided with a feed line for a cooling gas. It will be appreciated that the cooling liquid can be fed at a plurality of locations, for example in the same plane or alternatively, if required, in planes lying one above the other. However, in general it will be sufficient to introduce the cooling liquid approximately in the central region of the cross-sectional area of the cooling apparatus. Preferably the cooling apparatus is provided with at least one guide part which is built into the interior space of the cooling apparatus. Each guide part extends for a substantial portion of its length in the direction of flow of the residue gasification. This built-in guide part is intended to prevent the residual coke from moving downwardly only in the central cross-sectional region and then emerging from the bucket wheel in an inadequately cooled state, whilst the residual coke located in the edge region, although adequately cooled, does not move downwardly or only moves downwardly slowly. In general, for reasons of saving space, it will be desirable for this downwardly extending built-in part not to have too large a cross-section, and the top and bottom of the built-in part can taper conically in a conventional manner.

The walls defining the said interior space can be at least partially in the form of a heat exchanger, or can be provided with a heat exchanger which, under normal operating conditions, absorbs the remainder of the heat to be eliminated from the coke. If, for some reason or other, the case should arise in which the coke contains a perceptible moisture content down to the central or bottom region of the cooling apparatus as a result of introducing the cooling liquid, the action of these heat exchangers can be reversed such that heat is introduced into the residual coke in these regions in order to evaporate the water located therein at least to the extent that it does not become troublesome during further handling of the residual coke. This reveral of the action of the heat exchanger will generally be effected automatically since, due to the relatively high temperature of, for example, 200° C. which the coke always exhibits upon leaving the cooling apparatus, the medium flowing through the heat exchanger will, after entering the heat exchangers, also have a relatively high level of temperature which will still result in a cooling action under normal operating conditions but which, with a reversal of the conditions, lies above the level of temperature of the moist residual coke, in, for example, the bottom region of the apparatus.

The present invention will now be further described, by way of example, with reference to the accompanying drawings, in which:

FIG. 1 is a longitudinal section through one embodiment of a system according to the present invention, comprising a reactor and cooling apparatus, FIG. 2 is a section taken on the line II—II of FIG. 1.

Cooling apparatus 11 is arranged within a pressure resistant casing 12 which is connected to a pressure-resistant casing 14 of a reactor 16, arranged thereabove, for the gasification of carbonaceous materials, and to a casing 18 arranged below the casing 12 and provided with a lock arrangement 20, to form a pressure-resistant system.

The carbonaceous materials to be gasified are fed to the reactor 16 by means of a screw conveyor 22. A feed line 24 for the gasification agent, such as hydrogen, is provided below the screw conveyor 22 at a distance therefrom. A fluidized bed 26 builds up in the bottom portion of the reactor 16 under the action of the upwardly flowing gasification agent.

The solid residues 28 of gasification, which generally still contain considerable quantities of carbon and are thus hereinafter referred to as "residual coke", accumulate below the fluidized bed 26 and pass through a passage 30 into the cooling apparatus 11 which is disposed below the reactor 16 and whose interior space 32, through which the gasification residues flow downwardly, is defined in part, by a spiral pipe 34. An insert 36, also of hollow cylindrical construction, is disposed between the pressure-resistant casing 12 and the spiral pipe 34 and, together with the casing 12, defines an annular chamber 38 within which is disposed a thermally insulating material such as mineral wool. Adjacent turns of the spiral pipe 34 are interconnected by a continuous web 40 such that the residual coke to be cooled cannot escape outwardly from the chamber 32 bounded by the inside of the spiral pipe 34.

The spiral pipe 34 is provided with an inlet line 42 and an outlet line 44 for a cooling medium and is secured in the top region of the casing 12 to a continuous bracket by, for example, welding. The bottom end of the spiral pipe 34 is free, that is to say, it is not secured, so that the spiral pipe can readily follow changes in length caused by fluctuations in temperature.

A built-in body 48 is disposed coaxially within the spiral pipe 34 and is held in position at a distance therefrom by means (not illustrated in the drawings) such as radial bars, ribs or the like which are secured to the webs 40 or to the actual tubes of the spiral pipe 34, such that an annular chamber 32 is created through which the residual coke flows downwardly. The built-in body 48 is intended to ensure that the heat is adequately eliminated in the centre of the gasification residues which are moving slowly downwardly.

The bottom end of the cooling chamber 32 is provided with an outlet opening 50 beyond which is disposed a bucket wheel located in a housing 52. The bucket wheel performs substantially a metering function, so that it determines the rate at which the residual coke flows downwardly through the chamber 32. Although the dwell time of the residual coke within the cooling apparatus depends upon the prevailing conditions, such as entry temperature, cooling performance and outlet temperature, an average dwell time of the individual granules of residual coke of, for example, the order of magnitude of from 5 to 20 minutes will continue a realistic value in practical operation.

The cooled residual coke discharged by the bucket wheel 54 enters the casing 18 and then the pressure lock 20 which substantially comprises two spaced shut-off elements 56 and 58 which are alternately opened and closed in a conventional manner. The region 60 located between the two elements 56 and 58 is provided with a line 62 through which the necessary equalisation of pressure is effected. The cooled solid residues of gasification flow outwardly through the bottom, opened shut-off element 58.

A feed line 64 for a cooling liquid is provided in the top region of the cooling apparatus 11 between the passage 30 and the top end of the built-in body 48. The cooling liquid, preferably water, is introduced through the line 64 directly into the top region of the chamber 32 and thus into the residual coke located therein. Thus, direct cooling takes place. A temperature sensor 68 is disposed at a suitable distance below the location or the region 66 in which the cooling liquid is introduced, the temperature sensor 68 being connected to a control 72 of a valve 74 by way of a line 70. The control valve 74 is incorporated in the feed line 64. Relatively accurate metering of the quantity of cooling water required at any given time can be achieved by way of the temperature sensor 68, so that, on the one hand, adequate cooling is effected by a direct method, although, on the other hand, the introduction of too great a quantity of liquid is avoided. It is necessary to avoid the introduction of too great a quantity of liquid as when it is greater than that corresponding to the quantity of heat required to be eliminated, this can then lead to difficulties when the residual coke is flowing downwardly through the chamber 32. Under normal operating conditions, the quantity of coke, the initial temperature and the quantity of water should be matched to one another such that at least the greater portion of the water is vaporized or is reacted with the carbon of the residual coke at the level at which the temperature is measured, that is to say, on a level with the temperature sensor 68. The temperature maintained in this region should lie in excess of the point of condensation of the cooling liquid under the conditions at any given time, that is to say, particularly at the prevailing operating pressure. It will be appreciated that it is possible, and also desirable, to introduce the cooling liquid into the residual coke so as to be fairly uniformly distributed over the cross-section of the cooling apparatus. Correspondingly, it is also possible to provide several temperature sensors 68 below the region or the plane in which the cooling liquid is introduced. It is only then necessary to determine which of the temperature sensors or which combination of measured values controls the chamber 32.

There is provided in the bottom region of the cooling apparatus at least one feed line 76 through which a gaseous cooling medium, which should be as dry as possible, is introduced into the interior space 32 of the cooling apparatus between the bottom end of the spiral pipe 34 and the bucket wheel 54. A smaller portion of the heat in the residual coke is carried off (also upwardly into the reactor 16) by means of this cooling gas. A further purpose of the cooling gas is to prevent steam, attributable to the cooling liquid introduced through the line 64, from flowing downwardly into those regions of the cooling apparatus 11 or of the chamber 32 in which the residual coke has already been cooled to a greater extent and in which there is thus the risk that the point of condensation of the steam will be passed in a negative direction. The cooling gas fed through the line 76 also leads to the cooling gas being mixed with the steam, so that the partial pressure of the steam in the resultant mixture of steam and cooling gas is any case lower, and thus the risk of condensation also decreases.

A further portion of the heat to be eliminated is absorbed by the medium flowing through the spiral pipe 34. It is thereby quite possible that, in the event of overmetering of cooling liquid leading to the residual coke being cooled to too great an extent below the point of condensation, conditions with respect to the transfer of heat between the residual coke and the spiral pipe 34 will be reversed at least in partial regions of the cooling apparatus, such that the temperature of the cooling medium lies above that of the residual coke and thus heat is transferred to the residual coke with the result that the temperature of the residual coke in any case increases to an extent that it lies above the point of condensation.

By way of example, if 75% of the total quantity of heat to be eliminated is removed by the cooling water, approximately 25% (relative to the total quantity of heat to be eliminated) is eliminated or dissipated as sensible heat by the water or the resultant steam, approximately 25% is eliminated or dissipated in the form of vaporization, and approximately 25% is eliminated or dissipated as chemical binding energy with the products of reaction produced during the endothermic reaction of water and gas. With an initial temperature of the residual coke in the order of magnitude of 700° to 900° C., it may readily be anticipated that reactions will take place between the steam and the carbon of the residual coke to form, particularly, CO and $H_2$. The remaining 25% of the heat is eliminated by the cooling gas introduced through the line 76 and/or the cooling medium flowing through the spiral pipe 34.

With an initial temperature of the residual coke of approximately 900° C. after leaving the passage 30, and a final temperature of approximately 200° C. upon being discharged from the cooling apparatus 11 by the bucket wheel 54, the above-described result will be obtainable with a water consumption in the order of magnitude of approximately 0.1 to 1.5 liters per kilogram of residual coke. This quantity of water would correspond to a water content, in the order of magnitude of from 1 to 2%, of the starting material, that is to say, the coal introduced into the reactor 16 by means of the screw conveyor 22. Consequently, although the portion of the cooling water which has not reacted with the carbon of the residual coke enters the reactor 16 in the form of steam, the reactions themselves taking place in the reactor are not impaired when, for example, the coal is to be hydrogasified in the reactor 16. The same also applies to the cooling gas which is fed through the line 70 and which can be the gasification agent used in the reactor 16 or, alternatively, some other gas such as $CO_2$. In order to achieve the desired aim, that is to say, additional cooling and possibly to avoid the intrusion of steam into the bottom regions of the cooling apparatus, it will generally be sufficient to introduce small quantities of gas through the line 70, unless the residual coke located in the cooling apparatus 11 is to be loosened by the upwardly flowing gas. This possibility also lies within the scope of the teaching of the present invention.

It has already been mentioned that, during the metering of the cooling water, it is important that the point of condensation should not be passed in a negative direction where steam might be present, in order to avoid condensation of the steam. The point of condensation lies at approximately 290° C. when the entire system is under pressure of, for example, 80 bar. Consequently, the water has to be metered such that the final temperature attained by the cooling action of the water lies a few degrees above the point of condensation, that is to say, for example, between 310° and 330° C. These conditions then result in the residual coke having a quantity of heat which is to be eliminated by the cooling gas and/or by the spiral pipe 34 in order to arrive at the desired final temperature of, for example, 200° or 250° C.

It will be appreciated that, when necessary it is possible to provide the outside of the built-in body 48 with a spiral pipe or to construct its outer wall in the form of a spiral pipe.

Further temperature sensors, such as 78 and 80, can be arranged between the upper temperature sensor 68 and the bucket wheel 54 and can serve to monitor and control the feeding of liquid and gaseous cooling media. By way of example, it is conceivable to use a temperature sensor, located in the bottom region of the cooling apparatus, to control the speed of rotation of the bucket wheel 54 in dependence upon the temperature measured at any given time, since the rotational speed of the bucket wheel affects the dwell time of the coke in the cooling apparatus, and the extent of the cooling action is also controllable through the dwell time.

I claim:

1. Apparatus for cooling the solid residues of gasification from a reactor operated at a pressure above atmospheric for the gasification of carbonaceous materials, which apparatus is disposed below the reactor and, together with the reactor, forms a pressure system with the reactor, said apparatus having an upper region and a lower region, said upper region of the cooling apparatus being substantially chutelike, at least some of the wall surface of said apparatus defining a cooling chamber comprising pipes through which a heat exchange medium can flow, elongated guide means positioned centrally of said cooling chamber and extending in the direction of flow of said residues of gasification substantially the length of said chamber from said upper region to said lower region, thereby forming an annular passage in said chamber through which said residues flow, said cooling chamber being provided with a first feed line for introducing a cooling liquid directly into said upper region of the cooling apparatus and into the solid residues located therein, a temperature sensor disposed downstream of this location in said upper region in the direction of flow of the residues of gasification to be cooled, and said lower region of the cooling apparatus being provided with a second feed line for introducing a gas directly into said lower region of the apparatus.

2. Apparatus according to claim 1, wherein walls defining a chamber in the cooling apparatus through which the solid gasification residues flow are at least partially formed by a serpentine pipe heat exchanger.

3. Apparatus according to claim 2 wherein said serpentine pipe heat exchanger is unsecured at its lower end.

4. Apparatus according to claim 1, wherein said pipes are arranged so as to abut closely against each other.

5. Apparatus according to claim 1 wherein said pipes are interconnected by webs.

* * * * *